(12) United States Patent
Donahoe et al.

(10) Patent No.: US 10,470,963 B1
(45) Date of Patent: Nov. 12, 2019

(54) COMBINATION WALKER AND CANE

(71) Applicants: Dustin T Donahoe, Grapevine, TX (US); Ashley Donahoe, Grapevine, TX (US); Volus Tucker McKenna, Pittsburgh, PA (US)

(72) Inventors: Dustin T Donahoe, Grapevine, TX (US); Ashley Donahoe, Grapevine, TX (US); Volus Tucker McKenna, Pittsburgh, PA (US)

(73) Assignees: Dustin T. Donahoe, Grapevine, TX (US); Ashley Donahoe, Grapevine, TX (US)

( * ) Notice: Subject to any disclaimer, the term of this patent is extended or adjusted under 35 U.S.C. 154(b) by 0 days.

(21) Appl. No.: 15/949,621

(22) Filed: Apr. 10, 2018

Related U.S. Application Data (63) Continuation-in-part of application No. 15/132,324, filed on Apr. 19, 2016, now Pat. No. 9,974,707.

(60) Provisional application No. 62/152,159, filed on Apr. 24, 2015.

(51) Int. Cl.
| | |
|---|---|
| *A61H 3/00* | (2006.01) |
| *F16B 7/04* | (2006.01) |
| *A45B 3/00* | (2006.01) |

(52) U.S. Cl.
CPC ............. *A61H 3/00* (2013.01); *A45B 3/00* (2013.01); *F16B 7/0486* (2013.01)

(58) Field of Classification Search
CPC .... A45B 9/00; A45B 9/02; A45B 3/00; A45B 1/02; A61H 3/00; A61H 3/04; A61H 3/02; A61H 2003/025
USPC ......... 135/65–67, 68, 76, 85; 482/65–69, 75
See application file for complete search history.

(56) References Cited

U.S. PATENT DOCUMENTS

| | | | | |
|---|---|---|---|---|
| 4,411,283 A * | 10/1983 | Lucarelli | ............. | A61H 3/00 135/67 |
| 4,993,446 A * | 2/1991 | Yarbrough | ............. | A61H 3/00 135/67 |
| 4,995,412 A * | 2/1991 | Him | ............. | A61H 3/00 135/67 |
| 5,785,070 A * | 7/1998 | Block | ............. | A45B 9/00 135/65 |
| 6,453,921 B1 * | 9/2002 | Rost | ............. | A61H 3/00 135/67 |
| 7,021,324 B1 * | 4/2006 | Clay | ............. | A61H 3/04 135/66 |
| 7,651,649 B2 * | 1/2010 | Obitts | ............. | A61H 3/00 264/242 |
| 9,233,047 B2 * | 1/2016 | Jordan | ............. | A61H 3/00 |
| 9,961,973 B2 * | 5/2018 | Kaplan | ............. | A45B 1/04 |
| 2011/0315177 A1 * | 12/2011 | McGann | ............. | A45B 9/02 135/67 |
| 2013/0319488 A1 * | 12/2013 | Chiu | ............. | A61H 3/00 135/67 |
| 2017/0303648 A1 * | 10/2017 | Ober | ............. | A45B 9/04 |
| 2017/0312164 A1 * | 11/2017 | Dollarhide | ............. | A45B 3/04 |

* cited by examiner

*Primary Examiner* — Winnie Yip
(74) *Attorney, Agent, or Firm* — Kenneth L Tolar (57) ABSTRACT

A combination walker and cane includes a pair of inverted, U-shaped frame members, each having a horizontal handlebar with a front leg and a rear leg depending therefrom. One of the rear legs is detachable from the remainder of the corresponding frame member to form a walking cane, if desired. Accordingly, a user can operate the walker in a conventional fashion, or detach the rear leg to form a walking cane.

9 Claims, 6 Drawing Sheets

COMBINATION WALKER AND CANE

CROSS REFERENCE TO RELATED APPLICATIONS

This application is a continuation-in-part of application Ser. No. 15/132,324 filed on Apr. 19, 2016, which claimed the benefit of provisional patent application No. 62/152,159 filed on Apr. 24, 2015, the specifications of which are both incorporated herein by reference.

BACKGROUND OF THE INVENTION

The present invention relates to a walker having a leg that detaches to form a cane when the user needs to ambulate in confined areas.

DESCRIPTION OF THE PRIOR ART

Those who ambulate with a walker must also transport a cane in order to move within confined spaces or to use stairways. However, holding a cane while operating a walker is cumbersome and inconvenient, particularly for the physically impaired. Though the cane may be horizontally supported on the walker's handlebars, it easily snags nearby objects, often causing accidents or property damage.

Accordingly, there is currently a need for a means of more easily transporting a cane when using a walker. The present invention addresses this need by providing a walker having a leg that can be detached to form a walking cane.

SUMMARY OF THE INVENTION

The present invention relates to a combination walker and cane comprising a pair of inverted, U-shaped frame members, each having a horizontal handlebar with a front leg and a rear leg depending therefrom. One of the rear legs is detachable from the remainder of the corresponding frame member to form an L-shaped walking cane, if desired. Accordingly, a user can operate the walker in a conventional fashion, or detach the rear leg to form a walking cane.

It is therefore an object of the present invention to provide a device that eliminates the need to separately transport a cane when using a walker.

It is therefore another object of the present invention to provide a walker having a rear leg that is detachable to form a cane.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
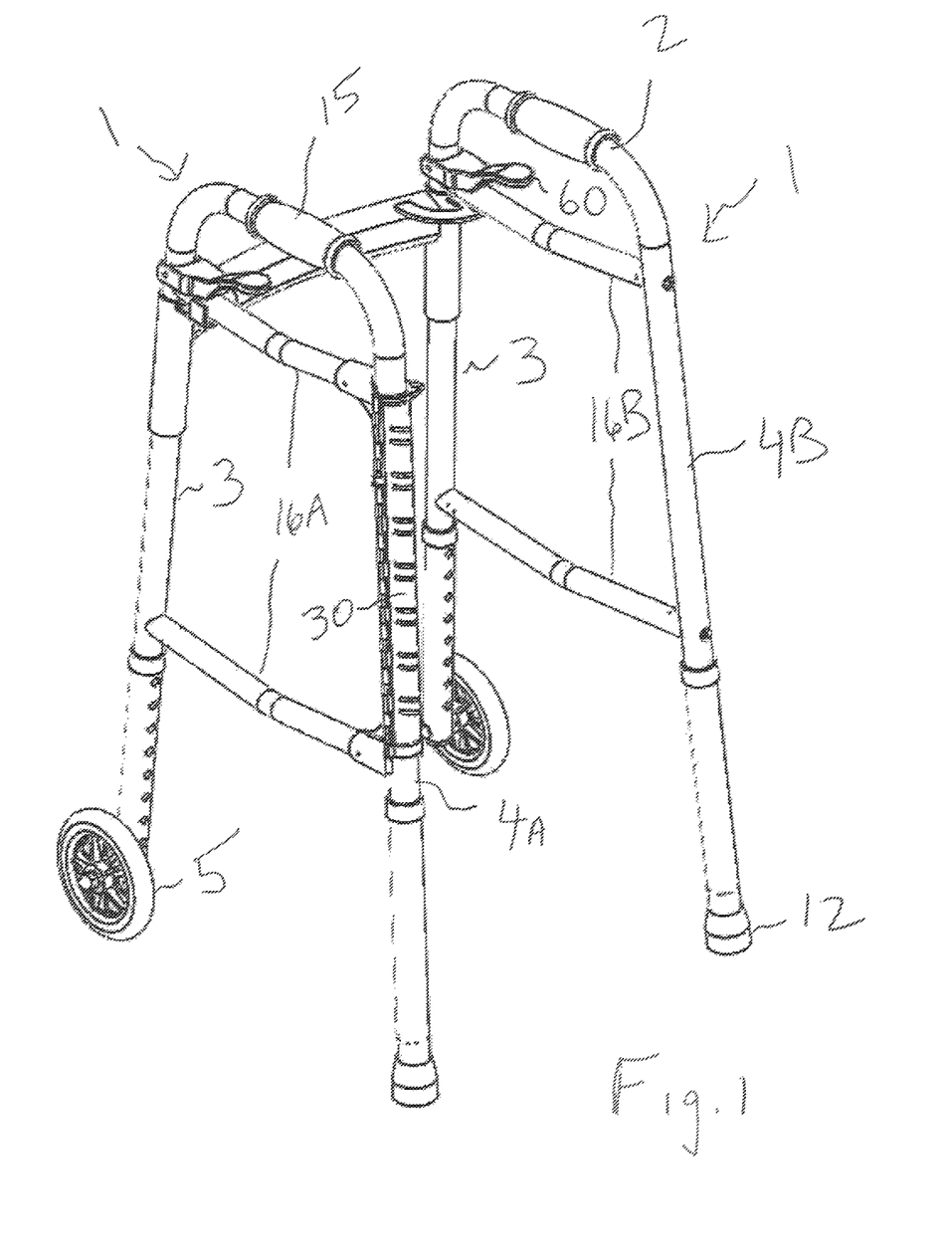
FIG. 1 is a perspective view of the combination walker and cane according to the present invention.

The present invention relates to a combination walker and cane comprising a pair of inverted, U-shaped frame members 1, each having a horizontal handlebar 2 with a front leg 3 and a rear leg 4A, 4B depending therefrom. At the lower, distal end of each front leg is a caster or wheel 5 that allows the frame members to roll along an underlying surface. Each wheel can be locked by a lever 60 that controls an internal braking mechanism of the type typically found on conventional walkers. A distal end of each rear leg includes a footpad 12 for gripping an underlying surface.

Each handlebar includes a foam handgrip 15 that a user grasps when using the device as a walker. Two pairs of support struts 16A, 16B interconnect the two front legs and two rear legs to allow the frame members to adequately support a user's body weight. One of the rear legs 4A is detachable from the remainder of the corresponding frame member to form a walking cane, if desired. The handlebar 2 of the corresponding frame member is formed of a tubular insert 6 that removably seats within an axial bore 7 in the handgrip 15 interior. A cylindrical attachment clamp 30 removably connects support struts 16A to the detachable rear leg 4A.

The attachment clamp 30 includes a base section 31 fixedly attached to the struts 16A and a movable section 32 hingedly attached thereto. The movable and base sections each include an outer edge 33 with a plurality of spaced, mating teeth 34 thereon. For example, the base section includes upwardly facing L-shaped teeth for interlocking with downwardly facing L-shaped teeth on the movable section to secure the attachment clamp about the detachable leg 4A. Therefore, a user must first lift the movable section 32 to release the base section. The inner edges of the two sleeves include spaced hinge barrels 40 that align with each other to receive an elongated hinge pin 41. A spring 42 positioned between a pair of aligned barrels normally biases the movable section downwardly to maintain the attachment clamp in a locked position unless physically separated by the user. Therefore, the teeth will not inadvertently disengage during normal use.

Figure 2:
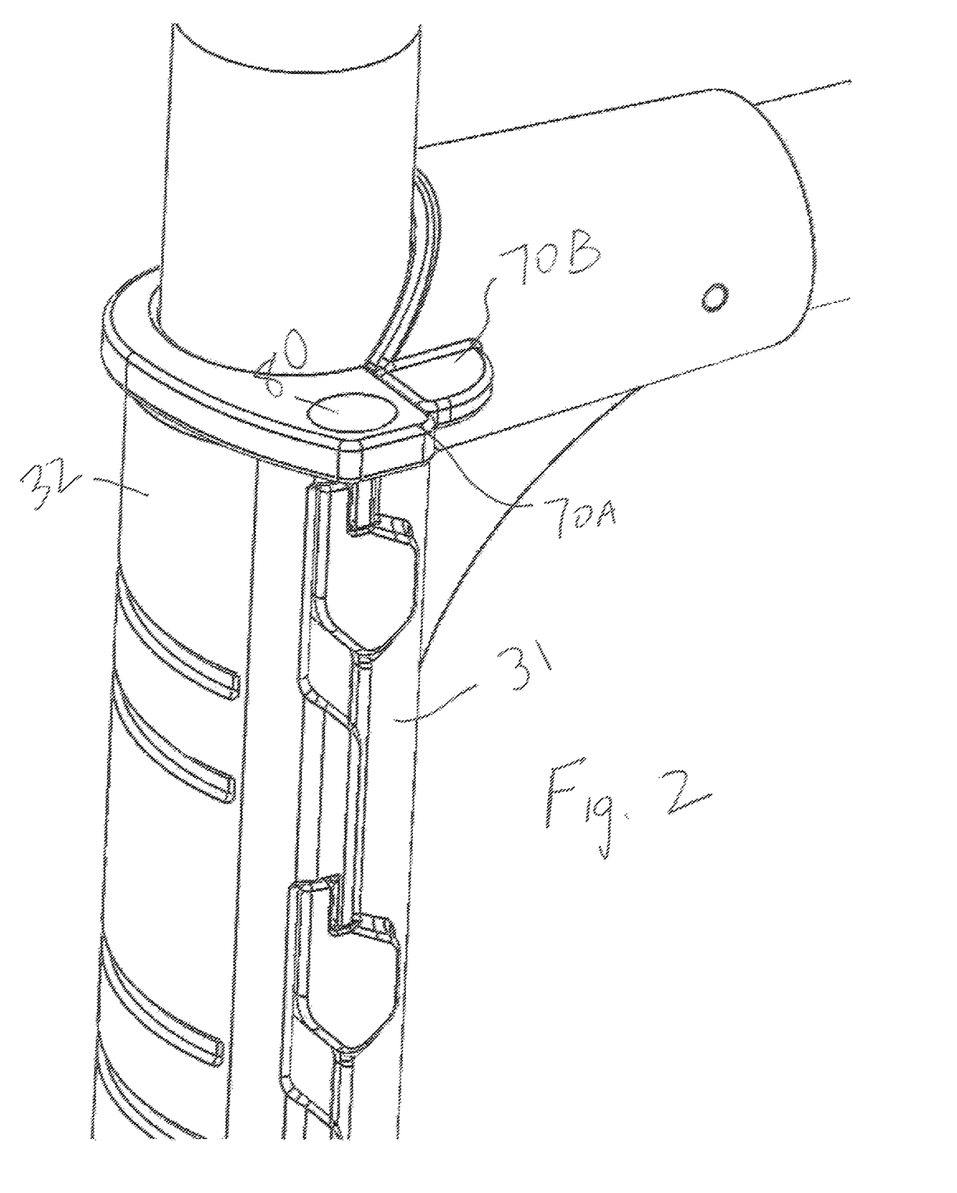
FIG. 2 is a sectional view of the attachment clamp fastened around the removable leg when the device is used as a walker.
Figure 3:
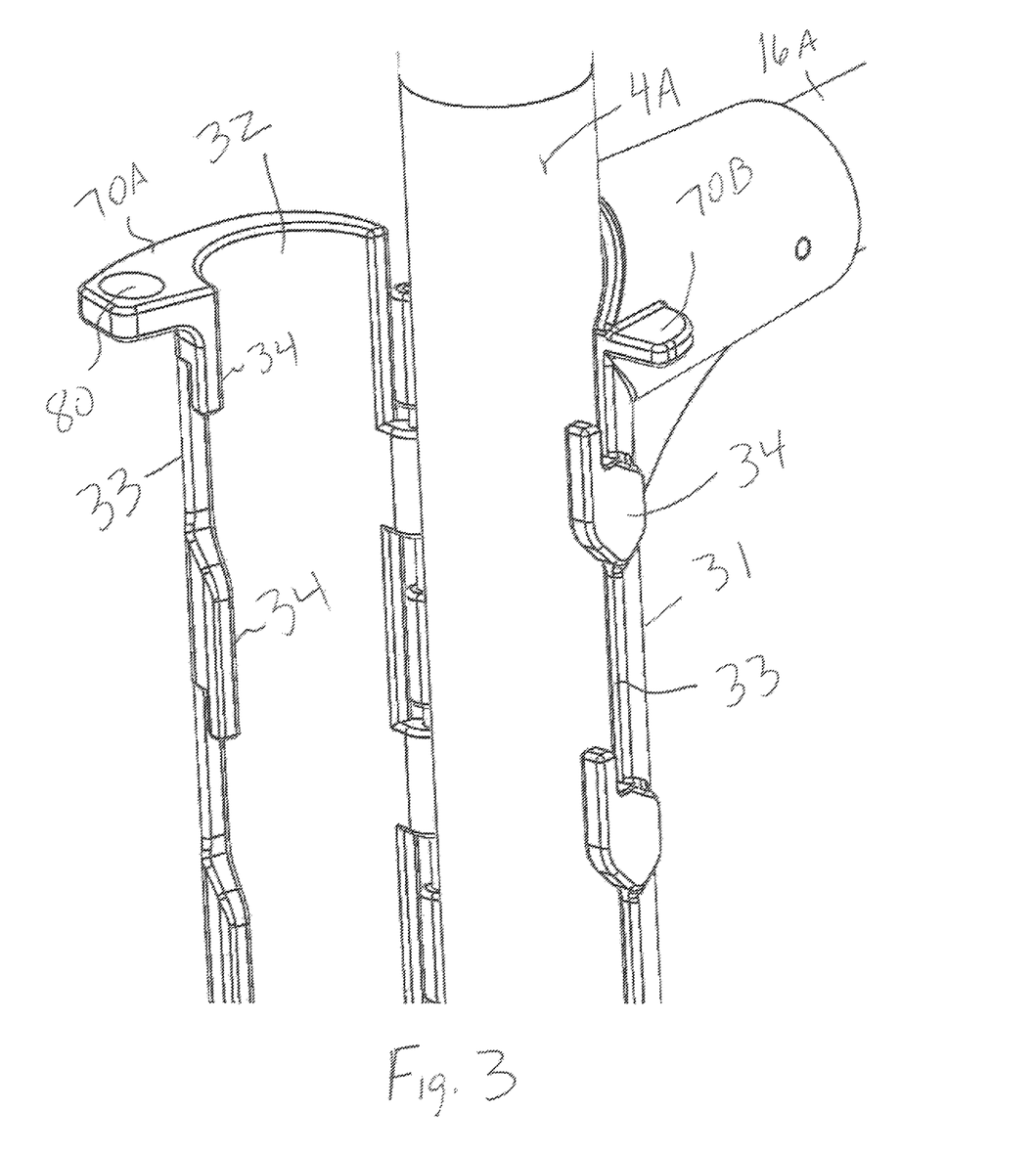
FIG. 3 is a sectional view of the attachment clamp of FIG. 2 in an open position to release the cane.
Figure 4:
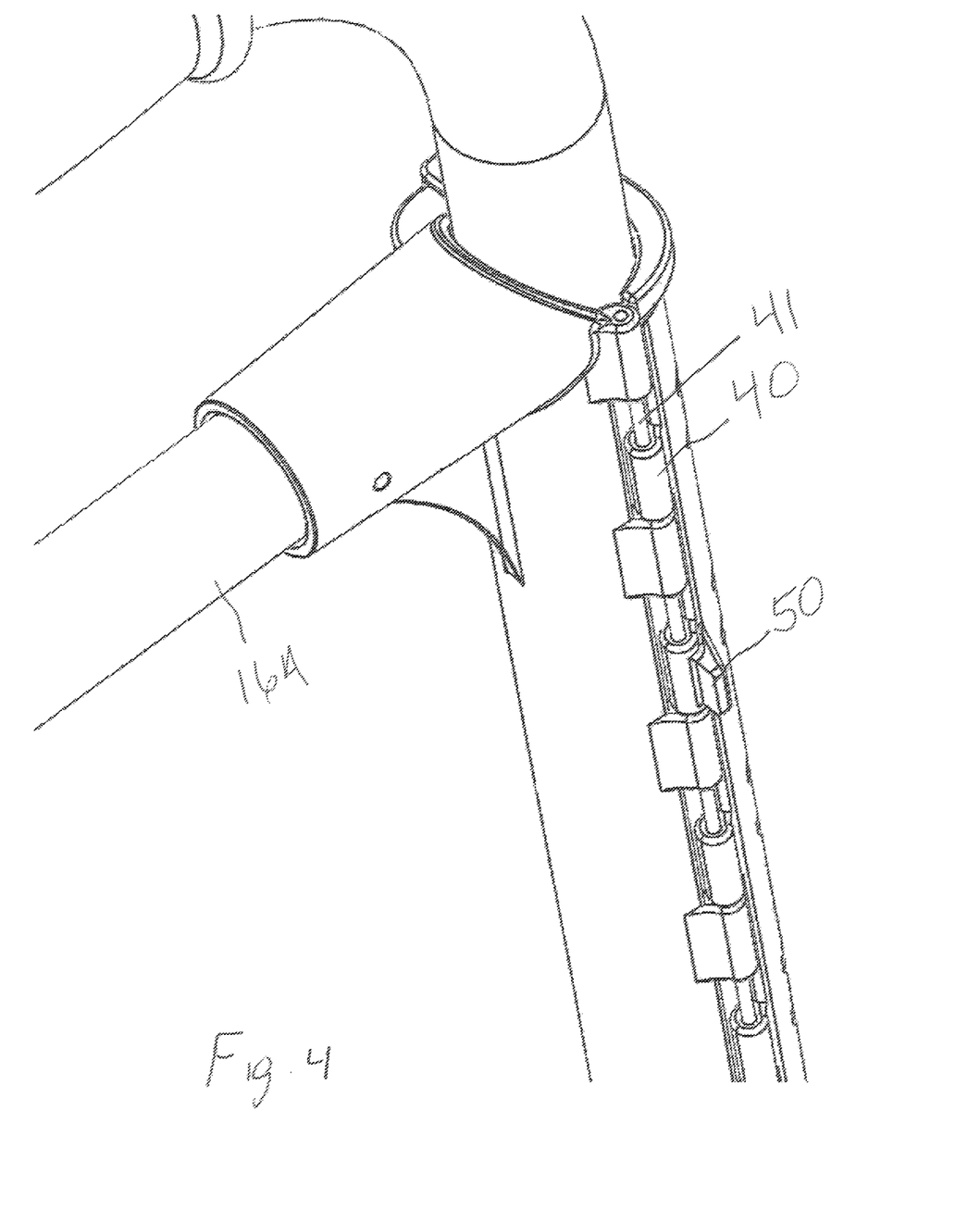
FIG. 4 is a sectional view of the attachment clamp from a side opposite that depicted in FIG. 2.

Because those who use a walker or cane are often visually impaired, the device includes a safety mechanism that allows the user to physically verify that the clamp is properly secured. The upper end of each section includes a tab 70A, 70B that is horizontally aligned and coplanar with the other tab whenever the two sections are securely joined. Therefore, a user can simply place a thumb or finger on the two tabs and immediately determine whether the clamp is properly fastened. The tab 70A on the movable section includes a thumb depression 80 to facilitate identification.

Figures 4, 5:
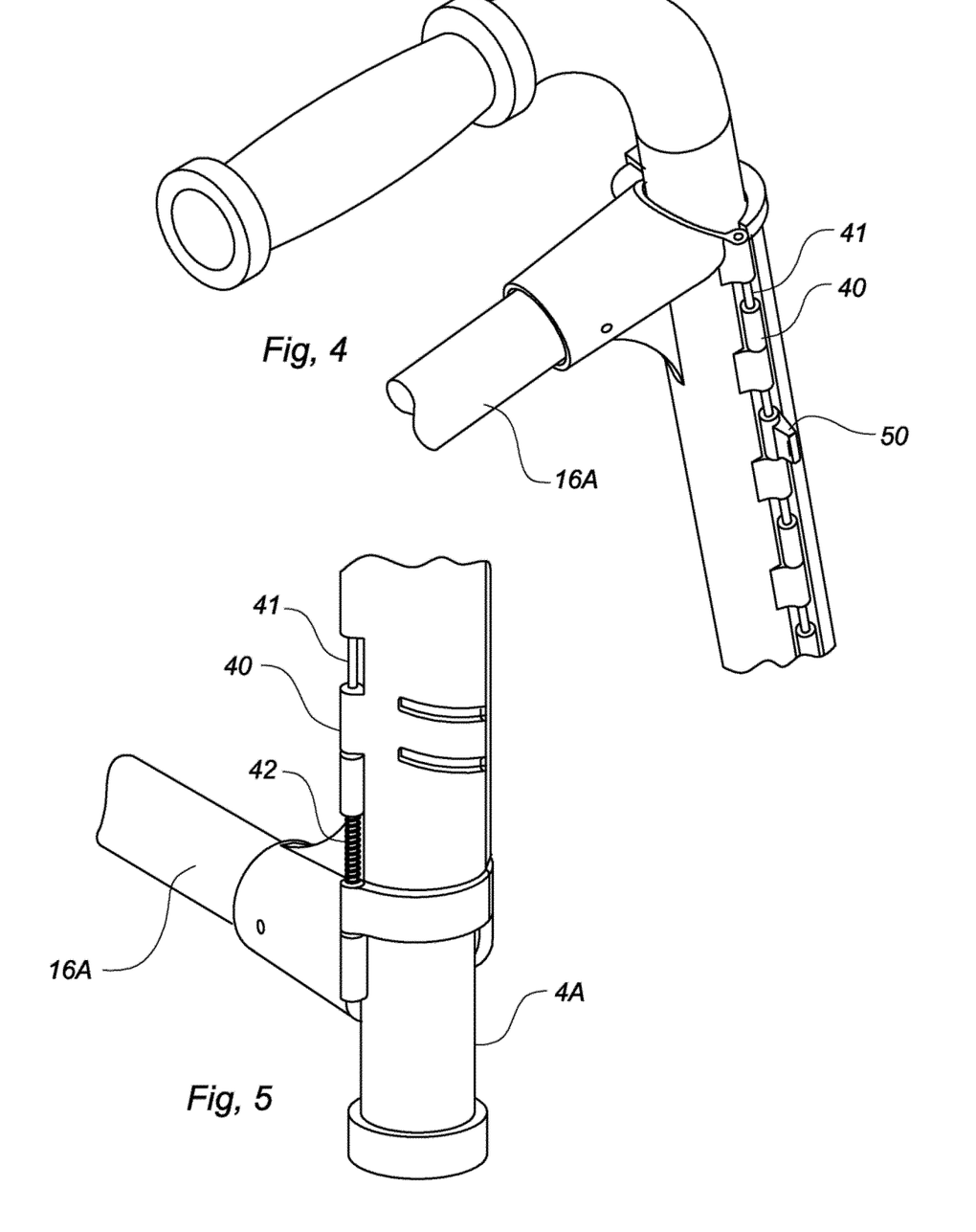
FIG. 5 is a lower, sectional view of the attachment clamp.
Figure 5:
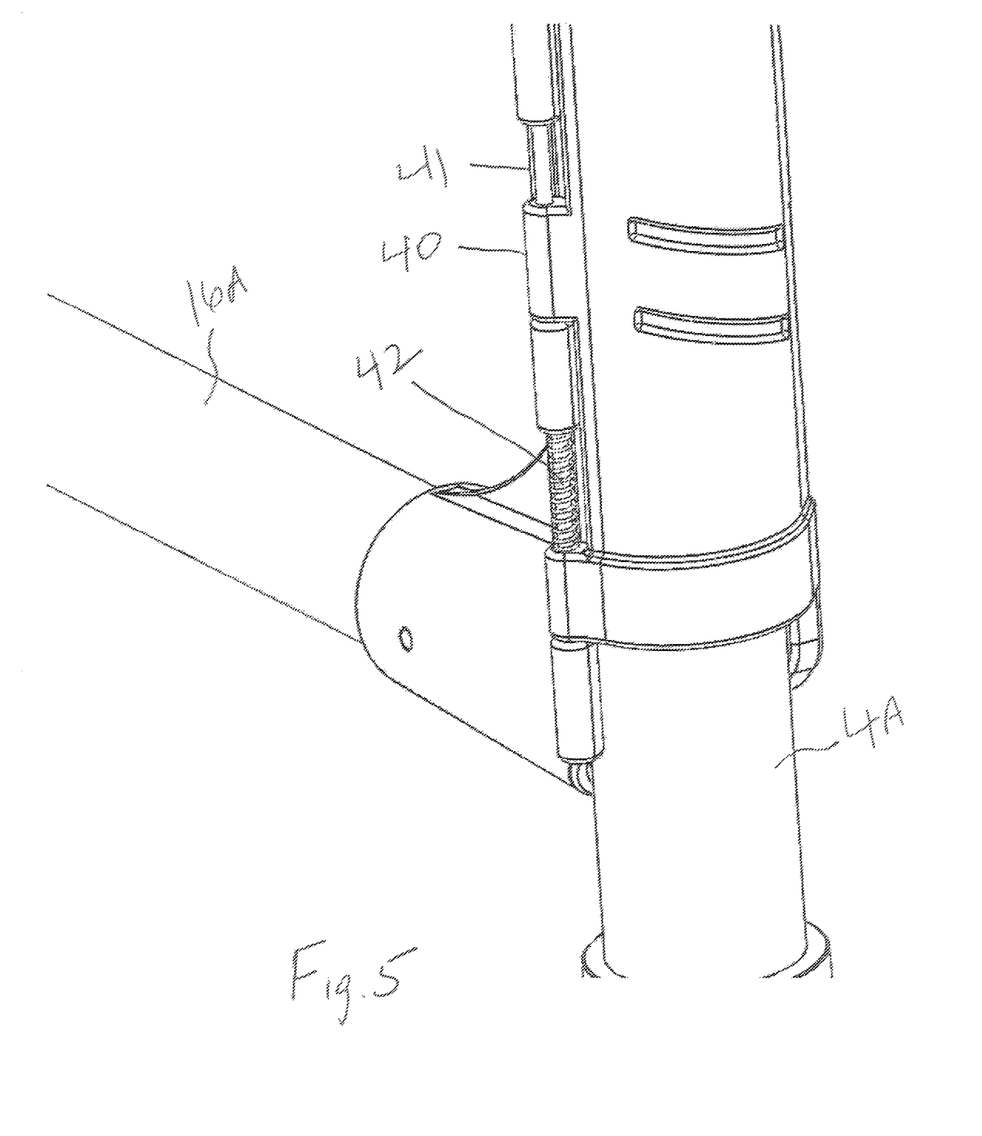
Figures 6, 7:
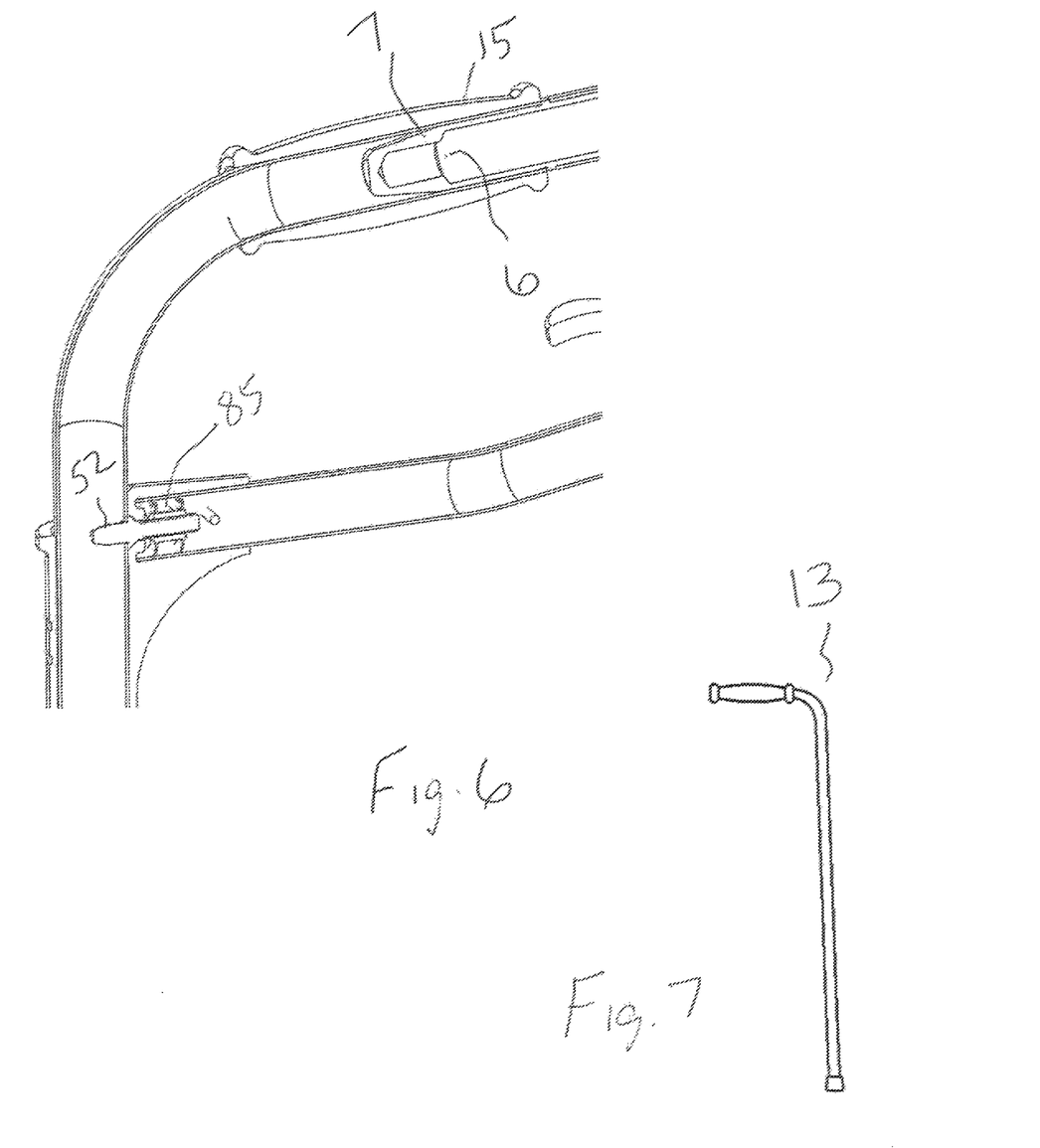
FIG. 6 is a sectional view of the detachable rear leg depicting the internal stabilizing lock.
FIG. 7 depicts the rear leg detached to form a cane.
Figure 6:
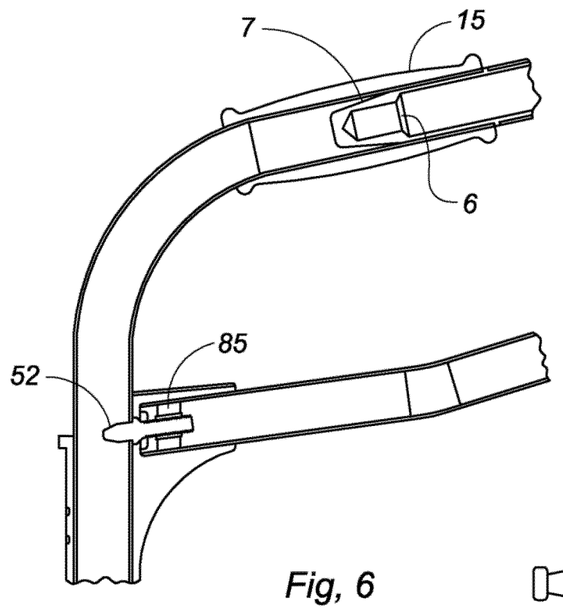
Figure 7:
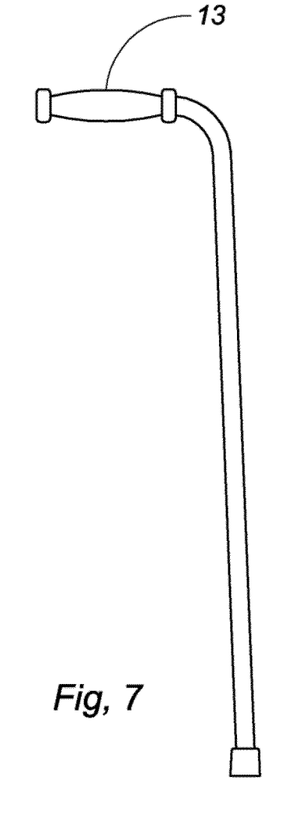

One of the hinge barrels on the movable section includes a stop member 50 to limit the range within which it pivots away from the base section so that it is readily accessible when the cane is reattached. A stabilizing lock 85 on the upper strut 16A includes a pin 52 that seats within an aperture on the removable leg to prevent vertical shifting within the attachment clamp.

Accordingly, when traversing open spaces, a user operates the walker in a conventional fashion. If a cane is needed to ambulate within confined spaces, the user pulls the movable section upwardly to separate the interlocked teeth, and pivots the movable section to release the detachable leg. The handgrip is then separated from the handlebar insert 6 to form an L-shaped walking cane 13 that may be used as desired.

The above-described device is not limited to the exact details of construction and enumeration of parts provided herein. For example, the attachment clamp includes at least an upper and a lower pair of interlocking teeth but could include additional intermediate pairs depending upon the size, capacity and other factors associated with the walker. Preferably, the lower pair of mating teeth are larger than the upper and any intermediate pairs in order to withstand the additional burden that the lower end of the detachable leg endures when the user is traversing thresholds and similar floor obstructions. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A combination walker and cane comprising:
   a first inverted, U-shaped frame member and a second inverted, U-shaped frame member, said first inverted, U-shaped frame member and said second inverted U-shaped frame member each formed of a horizontal handlebar with a front leg and a rear leg depending therefrom;
   at least one support strut extending from the front leg of said first inverted U-shaped frame member to the rear leg of said first inverted U-shaped frame member;
   means for removably attaching the rear leg of said first inverted U-shaped frame member to a remaining portion of said first inverted U-shaped frame member to form a walking cane, wherein said means includes a clamp formed of base section at an end of said support strut and a movable section hingedly attached to said base section;
   a plurality of mating intermeshing teeth on each of said base section and said movable section for removably attaching said movable section to said base section to secure the rear leg of said first inverted U-shaped frame member therebetween.

2. The combination according to claim 1 further comprising:
   the handlebar of said first U-shaped frame member formed of a horizontal handgrip at an upper end of the rear leg of said first U-shaped frame member, said handgrip having an axial bore;
   the handlebar of said first U-shaped frame member further formed of a horizontal tubular insert at an upper end of the front leg of said first U-shaped frame member, said insert removably seating within said axial bore.

3. The combination according to claim 1 further comprising a means for biasing the teeth into locking engagement to prevent inadvertent separation.

4. The combination according to claim 1 further comprising a stabilizing lock on the support strut, said stabilizing lock having a pin that seats within an aperture on the rear leg of said first inverted U-shaped frame member to prevent vertical shifting within the clamp.

5. The combination according to claim 1 further comprising a safety means for manually verifying that the intermeshing teeth are securely joined.

6. The combination according to claim 5 wherein said safety means comprises:
   a first tab on an upper end of said movable section;
   a second tab on an upper end of said base section, said first tab aligned with said second tab when said intermeshing teeth are securely joined.

7. The combination according to claim 1 wherein a distal end of the rear leg of each of said first inverted, U-shaped frame member and the second inverted, U-shaped frame member includes a footpad for gripping an underlying surface.

8. The combination according to claim 1 wherein the movable section includes a stop member that limits the range within which said movable member pivots away from the base section so that said movable section is accessible when the cane is reattached.

9. The combination according to claim 6 wherein the first tab includes a thumb depression to facilitate identification.

* * * * *

UNITED STATES PATENT AND TRADEMARK OFFICE
CERTIFICATE OF CORRECTION

| | |
|---|---|
| PATENT NO. | : 10,470,963 B1 |
| APPLICATION NO. | : 15/949621 |
| DATED | : November 12, 2019 |
| INVENTOR(S) | : Dustin T. Donahoe et al. |

It is certified that error appears in the above-identified patent and that said Letters Patent is hereby corrected as shown below:

On the Title Page

Below the Abstract, delete "9 Claims, 6 Drawing Sheets" and insert --9 Claims, 4 Drawing Sheets--.

In the Drawings

Figures 1-7 should appear as in the attached drawing sheets.

Signed and Sealed this
Twenty-first Day of July, 2020

Andrei Iancu
*Director of the United States Patent and Trademark Office*